Figure 1:
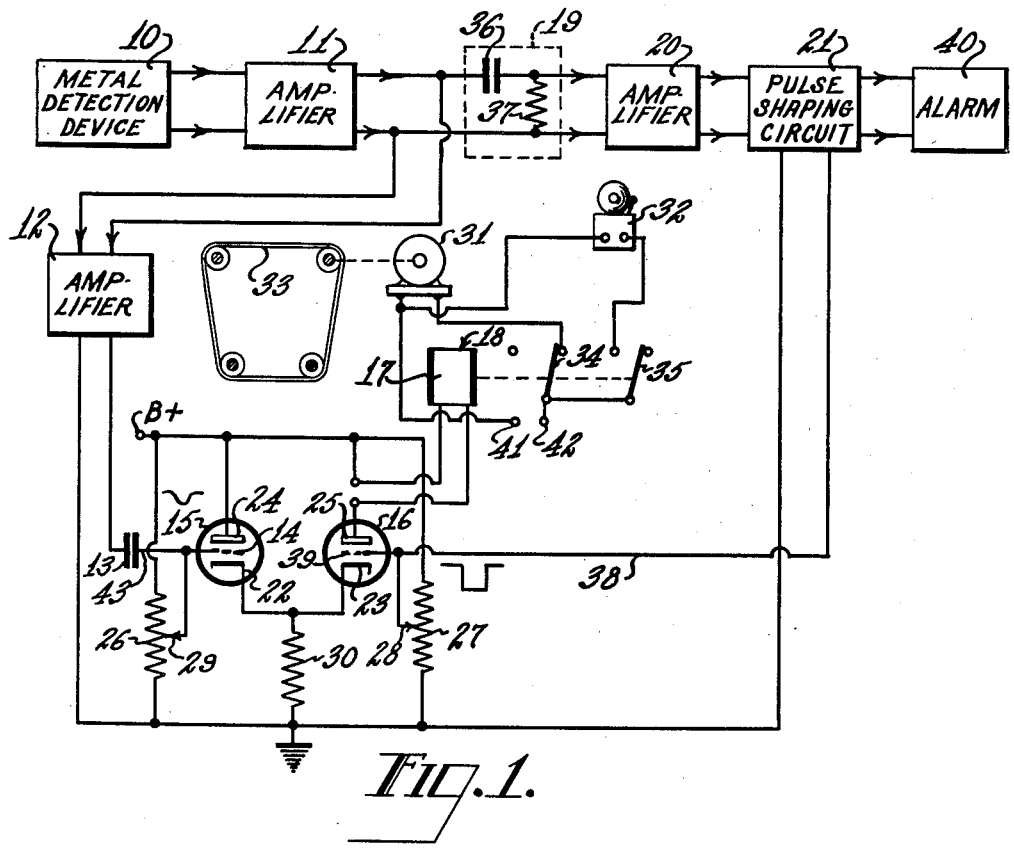

April 8, 1958     L. SHAPIRO     2,830,263
METAL DETECTOR
Filed Jan. 26, 1955

INVENTOR.
LOUIS SHAPIRO
BY Morris (signature)
ATTORNEY

United States Patent Office 2,830,263
Patented Apr. 8, 1958

2,830,263
METAL DETECTOR

Louis Shapiro, Delaware Township, Camden County, N. J., assignor to Radio Corporation of America, a corporation of Delaware Application January 26, 1955, Serial No. 484,264

The terminal fifteen years of the term of the patent to be granted has been disclaimed 5 Claims. (Cl. 324—41)

The present invention relates to noise elimination. It is more particularly concerned with the automatic elimination of random electrical noise signals of a transient nature.

Electrical noise signals, including those of a transient nature, are detected together with information signals by electrical equipment and may be confused with the information signals. This normally causes an erroneous output response from the electrical equipment which may have serious consequences. Interference, in the nature of radiation of spurious electrical transients may be due to natural phenomena, such as lightning and other static electrical eruptions. Man made interference of this kind is, however, more prevalent. For example, interference may be produced by commutators on electrical motors, ignition systems of internal combustion engines and the operation of switches in lighting circuits. The effect of this disturbing interference is experienced in electrical communications equipment and often leads to unpleasant or incomprehensible reproduction of the transmitted information.

In industrial installations, the amount of random electrical interference is increased. Sensitive electronic equipment is often located in such industrial installations. Metal detection equipment, for example, is ordinarily located in factories, near mines, or in other similar industrial locations.

The metal detector may comprise a detection device which is responsive to metal particles. For example, a coil forming part of a radio frequency oscillator system may be used to detect metal particles. The output of the oscillator is changed in response to the presence of metal, and an information signal indicating the presence of the metal particle is transmitted to a utilization device. The utilization device may be a circuit for operating a relay. The relay contacts may cause the operation of various pieces of equipment such as conveyor belts and alarms. If interference is induced into the detection coil, the operation of the oscillator may be disturbed. An erroneous indication of the presence of a metal particle may then be transmitted. Should the metal detector on the detection of a metal particle be adapted to stop a production line or a critical operation, an erroneous indication would have serious consequences.

It is an object of the present invention to automatically eliminate disturbing interference in electrical transmission systems.

It is another object of the present invention to automatically eliminate the production of erroneous signals in response to interference, such as random noise impulses.

It is a further object of the present invention to automatically eliminate interfering noise signals by temporarily changing the mode of operation of the equipment through which the noise signals pass on the occurrence of a noise signal.

It is still a further object of the present invention to automatically eliminate random noise impulses in a signal channel by temporarily blocking the signal channel for the duration of the noise impulse.

It is a still further object of the present invention to automatically eliminate noise induced in metal detection equipment.

It is a still further object of the present invention to automatically eliminate noise impulses received by electrical equipment by detecting these noise impulses according to the distinguishing characteristics between the noise signals and information signals and by applying the detected noise signals to temporarily eliminate any output signal from the electrical equipment.

It has been found that disturbing noise impulses are generally analogous to a characteristic electrical transient having a pronounced rapid rise time. In other words, the frequency components in the noise signal extend into the high frequency range. On the other hand, information signals produced by certain electrical equipment are impulses characterized by a slow or gradual rise time and consequently a frequency spectra that is predominantly composed of low frequency components. Metal detection equipment, for example, produces such information signals.

The present invention consequently provides for the detection of noise signals by means of rise time or frequency discrimination. The detected signals may then be applied to suitable electronic control devices for temporarily preventing any electrical equipment from producing an output signal. The equipment will operate normally except during the duration of a detected noise impulse.

Figure 2:
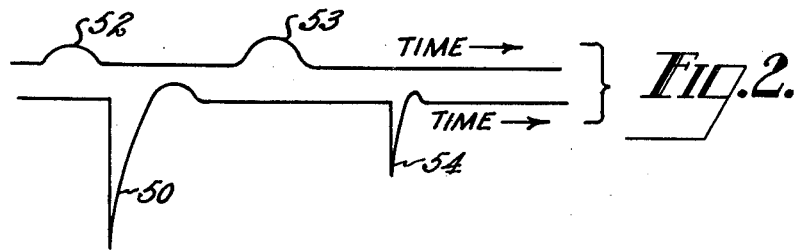

Other objects and advantages of the present invention will, of course, become apparent and immediately suggest themselves to those skilled in the art to which the invention is directed from a reading of the following specification in connection with the accompanying drawing in which:

Figure 1 is a diagram, partially schematic and partially in block form, which illustrates an embodiment of the present invention; and Figure 2 shows waveforms of typical noise signals and typical information signals which may be applied to the embodiment of the present invention illustrated in Figure 1.

Referring to the drawing, and particularly to Figure 1 wherein one embodiment of the present invention is illustrated, a metal detection device 10 is shown. This metal detection device 10 may be of known construction and is illustrative generally of electrical apparatus for receiving or sensing an information signal. As a description of details of construction of the metal detection device 10 is not necessary for an understanding of the present invention, it will be described only generally. Such devices may contain pick-up means which are excited by radiated signals. The metal detection device 10 is shown since it produces information signals having slow rise times such as shown in the upper waveform of Figure 2 and is excited by interference or noise impulses of the type having a rapid rise time. Such noise impulses are shown in the lower waveform of Figure 2. It will be apparent, that the information signals are comprised substantially of low frequency components whereas the interference impulses have a large number of large amplitude high frequency components.

The metal detection device 10 may be of the type which has a detection coil. Conductive or metallic particles passing through the detection coil produce information signals in the form of pulses. The detection coil may be the tank coil of an oscillator. A metallic particle passing through the coil will produce additional hysteresis and eddy current losses therein. The metal particle may also disturb the electromagnetic field in the coil. This effect may be reflected as a change in the plate current of the oscillator and thus provide an information signal which indicates the presence of the metal particle.

Information signals are transmitted through a signal channel comprising two amplifiers 11 and 12. The first amplifier 11 may be of the cathode follower type and will isolate the metal detection device 10 from other circuitry which will be described hereinafter. The second amplifier 12 may be a conventional amplifier. The output of the second amplifier 12 is applied through a capacitor 13 to the grid 14 of one of a pair of electron tubes 15 and 16. The tube 15, having its grid 14 connected through the capacitor, will be conveniently designated as the signal tube 15. The other tube 16 will be designated as the relay driver tube 16 for reasons that will be brought out later in detail. The relay driver tube 16 has the operating coil 17 of a relay 18 connected in its plate circuit. In the operation of the metal detection device 10, it is desired to operate the relay 18 on the occurrence of an information signal which denotes the presence of a metal particle. A control circuit serves to temporarily block the signal channel on the occurrence of a noise impulse. The control circuit comprises means 19 for detecting the noise impulses, an amplifier 20 and a pulse shaping circuit 21. The means 19 is shown as being enclosed by the dashed line. The amplifier 20 receives and amplifies the detected noise signals. The pulse shaping circuit 21 is connected to the output of the amplifier 20.

The pulse shaping circuit 21 may, illustratively, be of the multivibrator type. A monostable multivibrator may be employed. Such a multivibrator produces an output pulse of variable duration and amplitude. A monostable multivibrator automatically reverts to its original stable condition. Other pulse shaping devices including blocking oscillators may be alternatively used. Output signals from the pulse shaping circuit 21 are connected between the grid 39 of the relay driver tube 16 and a common connection designated as ground.

The control channel detects noise impulses in the signal channel and operates with the detected impulses to provide a rectangular wave, negative-going pulse signal as indicated in the drawing adjacent to the conductor 38 connected between the pulse shaping circuit 21 and the grid 39 of the relay driver tube 16. This signal may be used to block and thereby temporarily disable the driver tube 16. The signal tube 15 to which the second amplifier 12 in the signal channel is connected and the relay driver tube 16 provide a relay driver stage 22 which permits the transmission of an information signal and prevents the operation of a relay 18 on the occurrence of a noise impulse. A negative-going signal pulse is also applied to the grid 14 of the signal tube 15 in the relay driver stage from the signal channel. This signal pulse is indicated as occurring in the conductor 43 connected between the capacitor 13 and the grid 14 of the signal tube 15. An alarm circuit 40 is connected to the pulse shaping circuit 21. This alarm 40 is arranged to be operated when the relay driver stage is rendered inoperative to drive the relay 18. It will thereby inform the operator of the metal detection equipment that a noise impulse has been received.

The plate 25 of the driver tube 16 is connected through the operating coil 17 of the relay 18 to a source of operating voltage not shown but conveniently designated at B+. The plate 24 of the signal tube 15 is connected directly to B+. Two voltage divider resistors 26 and 27 are connected between B+ and ground. A movable tap 28 on one voltage divider resistor 27 is connected to the grid 39 of the driver tube 16 to control the bias applied thereto. Similarly, the other voltage divider resistor 26 is provided with a movable tap 29 connected to the grid 14 of the signal tube 15 for controlling the bias applied thereto. Any other convenient method for biasing the grids 14 and 39 of the tubes 15 and 16 may be employed. The cathodes 22 and 23 are connected to a common cathode resistor 30. The other end of this cathode resistor 30 is connected to ground.

The signal tube 15 and the relay driver tube 16 share somewhat equal amounts of plate current when the bias applied to each of the grids 14 and 39 is equal. A correspondingly larger share of the plate current will be drawn by the grid having the more positive bias applied thereto. Furthermore, when one of the tubes 15 or 16 is cut off, the other draws all of the plate current.

The equipment controlled by the relay 18 is shown illustratively as a motor 31 and an alarm bell 32. Two terminals 41 and 42 are available for connection to a source of operating power for the bell 32 and the motor 31. The motor 31 operates a conveyor belt 33 upon which the material to be inspected for the presence of metal may be located. With the relay contacts 34 and 35 in the position shown in Figure 1, the motor 31 is operating and the alarm bell 32 is off. When a metal particle is detected, the movable contact arms 34 and 35 are pulled in toward the operating coil 17 of the relay 18 and the motor 31 is stopped while the alarm bell 32 sounds.

Returning to the control circuit, it may be observed that the noise impulse detection means 19 shown within the dashed line is a differentiating circuit having a series capacitor 36 and a shunt resistor 37. Such a differentiating circuit is a rise time discriminator. It will transmit signals having a fast time rate of amplitude change; whereas impulses having a slow time rate of amplitude change will be greatly attenuated and, therefore, not transmitted. A differentiating circuit of the type shown may be preferred to more elaborate filter networks for deriving the high frequency components in the noise impulses because of its low cost. However, certain applications wherein the differences between the noise signals and the information signals may not be very pronounced and may require the use of such filter circuits. The amplifier 20 connected to the detection means 19 may be adapted to provide a high gain. This will be apparent since the output signal from the illustrative differentiating circuit may be considerably reduced in amplitude.

The operation of this embodiment of the present invention will be understood in connection with the schematic diagram shown in Figure 1. The metal detection device 10 supplies signal pulses such as shown in the upper waveform of Figure 2 when a particle of metal is detected. It may be noted that the pulses occur at random and have various amplitudes. The amplitude of the pulse depends upon the size of the metal particle which is detected. It may be observed, however, that these information signal pulses have relatively slow rise time and, therefore, exhibit a response in the low frequency range.

The noise impulses shown in the lower waveform of Figure 2 are produced most often by electrical discharges such as occur when a high current is switched. For example, a commutator of a direct current motor would radiate such impulses when sparking occurs on its commutator. The noise impulses are distributed at random intervals and may be of various amplitudes. They are shown herein as composed of a steep negative-going portion and a damped overshoot in the positive region. The negative-going nature of the noise impulses are shown by way of illustration since negative-going noise impulses may be observed at the output of the illustrative metal detection device 10 shown in Figure 1. It will be apparent to those skilled in the art that the present invention may be adapted to be responsive to positive-going noise impulses. Each noise impulse is characterized in that it has a rapid rise time. The illustrative noise impulses increase in magnitude rapidly in a negative-going direction. The absolute magnitude of the noise impulses has been observed to be as much as twenty five times greater than the signal impulses.

Noise impulses may occur between information signal pulses. The first noise impulse 50 appears in time between the two signal pulses 52 and 53. The noise impulse 54 occurs after the last signal pulse 53. If the control apparatus for eliminating the effects of noise impulses provided by the present invention were not employed, an erroneous indication would appear because of the first noise impulse 50 and the second noise impulse 54. This may be a serious fault in a metal detection system. A production line may be stopped or a valuable product may be rejected although that product is devoid of any metal.

The noise impulses and information pulses are impressed on the signal channel. They are amplified by the second amplifier 12 after passing through the cathode follower amplifier 11. The mixed signal of noise and information is applied through the capacitor 13 to the grid 14 of the signal tube 15. The rise time discrimination means 19, which is illustrated as a differentiating circuit in this embodiment of the present invention, detects only the noise impulses since they have a rapid rise time.

These noise impulses are amplified and applied to the pulse shaping circuit 21. Assuming the pulse shaping circuit 21 to be a monostable multivibrator, a substantially rectangular blocking pulse is derived from its output. The period from the monostable multivibrator may be set by adjusting the parameters of components therein in known manner to produce a pulse having a duration as long as the longest noise impulse which may be expected to be received. This duration may be determined experimentally.

A negative-going pulse is derived from the pulse shaping circuit 21 and applied to the grid of the relay driver tube 16. The pulses applied to the grid 14 of the signal tube 15 in the relay driver stage 22 from the signal channel is also arranged to be negative-going. The bias applied to the grids 14 and 39 of each of the tubes 15 and 16 in the relay driver stage 22 is arranged so that the grid 39 of the relay driver tube 16 will be much more negative than the grid 14 of the signal tube 15. Therefore, the signal tube 15 will draw the major portion of the plate current. Consequently, sufficient current will not flow in the plate circuit of the relay driver tube 16 to operate the relay 18. When the negative-going information signal is applied to the grid 14 of the signal tube 15, the positive grid bias of this tube will be decreased and a portion of the current flowing through this tube 15 will be transferred to the relay driver tube 16. This will cause operation of the relay 18. If, however, a noise impulse occurs it may tend to decrease the positive bias on the signal tube in a manner similar to an information signal. This would lead to the operation of the relay 18 and an erroneous indication. However, the control circuit detects this noise impulse. Consequently, a negative blocking pulse is applied to the grid 39 of the relay driver tube 16 approximately simultaneously with the arrival of the noise impulses on the grid 14 of the signal tube 15. The blocking pulse applied to the grid 39 of the relay driver tube 16 is preferably selected to be sufficiently negative to completely cut off the relay driver tube 16 notwithstanding the magnitude of the positive bias applied to the grid 39 of that tube 16. Since the relay driver tube 16 is cut off, the relay 18 cannot operate. The possibility of an erroneous indication is thereby avoided. The alarm 40 connected to the pulse shaping circuit 21 indicates that the relay driver tube is cut off. The relay driver tube 16 will remain cut off for the duration of the noise signal impulse. The relay driver stage 22 is restored to its normal operating condition when the monostable multivibrator provided in the pulse shaping circuit 21 returns to its stable condition.

What is claimed is:
1. A system for eliminating random noise impulses in the output signal provided by metal detection equipment in which said noise impulses are distinguishable from information signals occuring in said output signal upon detection of metallic material according to the rise time characteristics of said information signals and said impulses comprising a signal channel for transmitting said output signal, means responsive to said output signal for controlling a utilization device, said last named means being connected to the output of said signal channel so as to receive said output signal, and discriminator means connected at a point in said signal channel being responsive to the rate of change in the amplitude of said signals transmitted through said channel, said discriminator means producing an output signal in response to each of said noise impulses in said signal channel having a rate of amplitude change that is greater than a predetermined magnitude, said utilization device controlling means including means actuated by said output signal from said discriminator means for preventing the operation of said utilization device.

2. In a metal detection system having a detection device and an output circuit, a circuit for rendering said system inoperative for the duration of a random electrical noise impulse induced therein comprising a filter circuit adapted to transmit frequency components that are higher than a predetermined frequency connected to said detection device for detecting said noise impulse, and means actuated by said detected noise impulse for rendering said output circuit of said metal detection system inoperative during the presence of said noise impulse.

3. In a metal detection apparatus having a detection device responsive to the presence of a metal particle and an output circuit for providing a signal in response to the detection of said metal particle, a control circuit for disabling said output circuit on the occurrence of a noise impulse, said control circuit comprising means responsive to the rise time of signals produced by said detection device and supplied thereto, and means actuated by said rise time responsive means for disabling said output circuit for a predetermined interval.

4. In a metal detection apparatus having a detection device responsive to the presence of a metal particle and a utilization device for providing a signal in response to the detection of said metal particle by said detection device, a control circuit for disabling said output circuit on the occurrence of a noise impulse comprising a differentiating circuit connected to said detection device, a pulse shaping circuit connected to said differentiating circuit and operated by output signals therefrom to produce a blocking pulse, a driver stage coupled to said utilization device, means for applying said signal from said metal detection circuit to said driver stage, and means for applying said blocking pulse from said pulse forming circuit to said driver stage to temporarily disable said stage.

5. A system for eliminating randomly occurring noise impulses in the output signal provided by a metal detector in which information signals indicative of detected metallic material are distinguishable from noise impulses in accordance with the rise time characteristics thereof, said system comprising a relay for actuating devices adapted to provide predetermined operation upon detection of metallic material when operated, a signal channel and a control channel coupled to the output of said metal detector, a differentiating circuit included in said control channel, said differentiating circuit being responsive to the rise time of said signals transmitted therethrough so as to provide an output signal in response to noise impulses transmitted through said control channel, a circuit for providing in said control channel an output pulse of predetermined duration in response to said output signal from said differentiating circuit, a control circuit for actuating said first named means, said control circuit including a pair of electronic devices having control elements, one of said electronic devices being connected to said relay so as to provide for the operation thereof, and means interconnecting said electronic devices to provide for the control of the one of said devices connected to said relay by the other of said electronic devices whereby the one of said devices connected to said relay is normally conductive to an extent insufficient to operate said relay, said control element of said other of said electronic devices being connected to said signal channel, said control element of the one of said devices connected to said relay being connected to said control channel output, the other of said electronic devices providing for increased conduction of the one of the said devices connected to said relay when a signal is transmitted by said signal channel, said one of said devices connected to said relay being prevented from becoming increasingly conductive upon the application of said pulse to the control element thereof whereby to prevent said relay from becoming operated.

References Cited in the file of this patent

UNITED STATES PATENTS

| | | |
|---|---|---|
| 2,250,144 | Welty | July 22, 1941 |
| 2,231,371 | Roberts | Dec. 11, 1941 |
| 2,546,771 | Mork | Mar. 27, 1951 |